(12) United States Patent
Wenzelburger et al.

(10) Patent No.: US 9,669,474 B2
(45) Date of Patent: Jun. 6, 2017

(54) SINGLE-LIP DRILL

(71) Applicant: botek Praezisionsbohrtechnik GmbH, Riederich (DE)

(72) Inventors: Juergen Wenzelburger, Metzingen (DE); Juergen Deeg, Metzingen (DE)

(73) Assignee: botek Praezisionsbohrtechnik GmbH, Riederich (DE)

( * ) Notice: Subject to any disclaimer, the term of this patent is extended or adjusted under 35 U.S.C. 154(b) by 137 days.

(21) Appl. No.: 14/423,167

(22) PCT Filed: Aug. 20, 2013

(86) PCT No.: PCT/DE2013/000467
§ 371 (c)(1),
(2) Date: Feb. 23, 2015

(87) PCT Pub. No.: WO2014/029380
PCT Pub. Date: Feb. 27, 2014

(65) Prior Publication Data
US 2015/0217383 A1 Aug. 6, 2015

(30) Foreign Application Priority Data

Aug. 24, 2012 (DE) .................. 10 2012 016 660

(51) Int. Cl.
*B23B 51/02* (2006.01)
*B23B 51/04* (2006.01)

(52) U.S. Cl.
CPC .......... *B23B 51/04* (2013.01); *B23B 2222/28* (2013.01); *B23B 2228/10* (2013.01); *B23B 2251/04* (2013.01); *B23B 2251/082* (2013.01); *B23B 2251/14* (2013.01); *B23B 2251/201* (2013.01); *B23B 2251/424* (2013.01); *Y10T 408/89* (2015.01)

(58) Field of Classification Search
CPC ........ B23B 2251/422; B23B 2251/424; B23B 2251/082; B23B 2251/201; B23B 2251/14
See application file for complete search history.

(56) References Cited

U.S. PATENT DOCUMENTS

| 841,184 | A | * | 1/1907 | Roeske | ............... B23B 51/0486 408/199 |
| 1,513,350 | A | * | 10/1924 | Stolle | ..................... B23B 41/02 144/14 |
| 7,753,627 | B2 | | 7/2010 | Randecker et al. | |

(Continued)

FOREIGN PATENT DOCUMENTS

| DE | 79 05 118 U1 | 5/1979 |
| DE | 79 22 246 U1 | 11/1979 |

(Continued)

OTHER PUBLICATIONS

International Search Report of PCT/DE2013/000467, mailed Jan. 2, 2014.

(Continued)

*Primary Examiner* — Daniel Howell
(74) *Attorney, Agent, or Firm* — Collard & Roe, P.C.

(57) ABSTRACT

A single-lip drill including at least one cutting edge on a drill head has a face which is concave along at least 75 percent of the width thereof and substantially along the entire length thereof, all the way to, and inclusive of, the cutting edge.

16 Claims, 11 Drawing Sheets

(56) References Cited

U.S. PATENT DOCUMENTS

| | | | | |
|---|---|---|---|---|
| 9,339,875 B2* | 5/2016 | Eggemann | .............. | B23B 51/04 |
| 2005/0244236 A1* | 11/2005 | Bosman | .................. | B23B 51/04 |
| | | | | 408/59 |
| 2011/0150589 A1 | 6/2011 | Kauper et al. | | |

FOREIGN PATENT DOCUMENTS

| | | | |
|---|---|---|---|
| DE | 33 14 718 A1 | 10/1984 | |
| DE | 43 38 545 A1 | 3/1994 | |
| DE | 103 16 116 A1 | 10/2004 | |
| DE | 20 2009 012 566 U1 | 1/2010 | |
| GB | 261 651 A | 11/1926 | |
| JP | 63047004 A * | 2/1988 | |
| JP | 63102814 A * | 5/1988 | |
| JP | S63 102813 A | 5/1988 | |
| JP | 07237020 A * | 9/1995 | |
| JP | 08025120 A * | 1/1996 | |
| WO | 2009/012253 A1 | 1/2009 | |
| WO | WO 2011132686 A1 * | 10/2011 | ............. B23B 51/06 |

OTHER PUBLICATIONS

VDI 3210, Part 1, Deep-hole drilling, Mar. 2006, pp. 1-7.
VDI 3208, Guidelines for gun drilling, Mar. 1996, pp. 1-16.

* cited by examiner

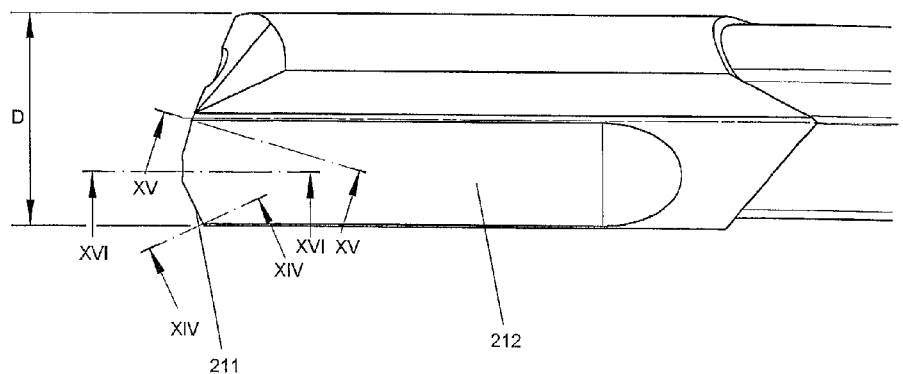
Fig. 13
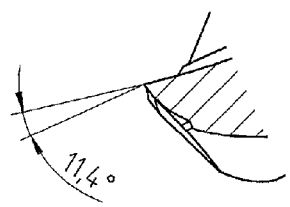
Fig. 14
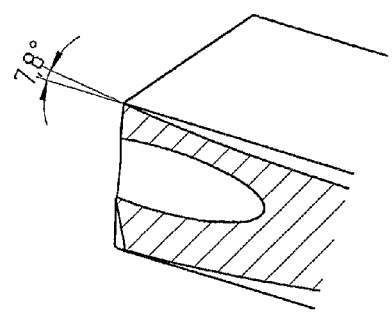

Fig. 15
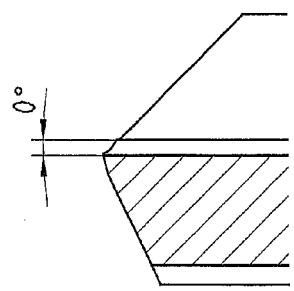
Fig. 16
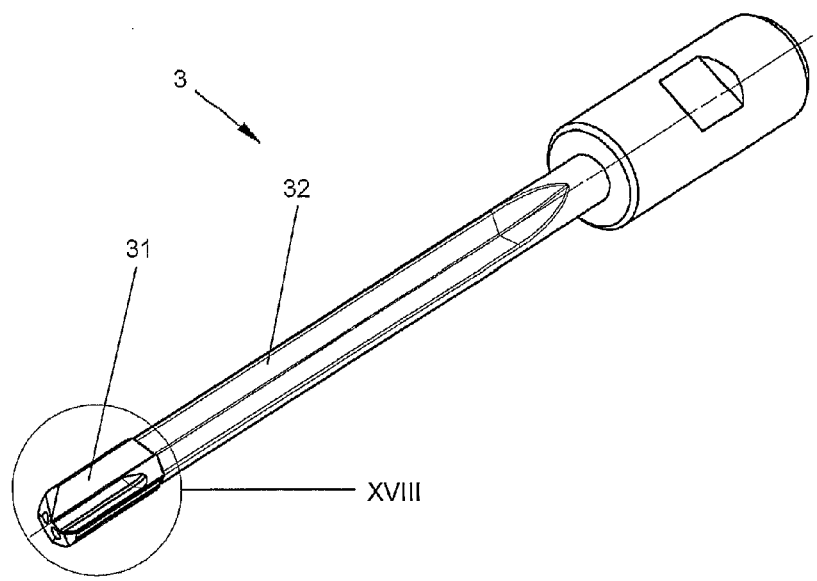
Fig. 17

SINGLE-LIP DRILL

CROSS REFERENCE TO RELATED APPLICATIONS

This application is the National Stage of PCT/DE2013/000467 filed on Aug. 20, 2013, which claims priority under 35 U.S.C. §119 of German Application No. 10 2012 016 660.5 filed on Aug. 24, 2012, the disclosure of which is incorporated by reference. The international application under PCT article 21(2) was not published in English.

The present invention relates to a single-lip drill having low cutting force.

PRIOR ART

A single-lip drill, also called a single-lip deep hole drill, is disclosed, for example, in DE 79 22 246 U1.

Single-lip drills are used to introduce boreholes into workpieces. Various types of single-lip drills are described in the VDI guidelines VDI 3210 and VDI 3208. Single-lip drills are primarily used to produce boreholes having comparatively small diameters, which are predominantly in the range of 0.5 mm to 50 mm, wherein the borehole depth can be a multiple of the borehole diameter, however. Typical values for the borehole depth are in the range of 20 times to 100 times the borehole diameter, but can also be greater or less than this.

In general, single-lip drills consist of a drill head and a drill shaft having a chucking end. At least one cutting edge is implemented on the drill head, which extends from the drill central axis up to the drill circumference. Furthermore, guide elements arranged on the circumference of the drill head can be provided. The drill head and the drill shaft are either connected to one another in a form fitted or integrally joined manner or they are produced from one piece. At least one channel, which extends in the drill shaft and the drill head, is provided, which has openings on the drill head and on the chucking end. Coolant originating from the chucking end is supplied under pressure through this channel, which exits at the drill head and has the task, in addition to cooling the cutting edge and the guide elements, in particular of flushing the chips arising during drilling through a V-shaped chip discharge groove provided in the drill head and in the drill shaft.

Single-lip drills are typically received on the machine side at their chucking end in a receptacle provided for this purpose in a spindle and are set into rotation by the spindle about the drill center axis. Simultaneously, the tool is moved along its center axis with a defined advance per revolution toward a workpiece. At the same time, the single-lip drill penetrates into the workpiece and the material of the workpiece is chipped off at the cutting edge arranged on the drill head and cut off of the workpiece in the form of chips. The chips arising in this case are flushed out by the coolant, which is supplied through at least one internal channel via the spindle, along a chip discharge groove out of the borehole. The chip discharge groove typically encloses an angle of approximately 90° to 130°.

It is also possible to have the workpiece execute the rotation and/or the advance movement or to execute the rotation and/or the advance movement partially by the tool and partially by the workpiece.

Single-lip drills are used as continuous drilling tools or as bore grinding tools. Continuous drilling tools are used to introduce boreholes into a solid material. In the case of continuous drilling, the entire circular cross section of the borehole is machined by the drilling tool. Boring tools are used to enlarge the diameter of a borehole already present in a workpiece. The already provided "borehole" or opening can have been drilled, cast, or produced in another manner in this case and is smaller in its diameter than the borehole to be produced by the drilling tool. A ring-shaped cross section is machined during the boring.

Single-lip drills are preferably used to introduce boreholes into workpieces which are not producible or are not producible cost-effectively using other manufacturing methods. These workpieces are often produced in large series. Improvements which result in an increase of the manufacturing speed are therefore generally desirable and even small improvements result in significant savings in the manufacturing costs.

The manufacturing speed is defined in the case of drilling tools by the product of advance per revolution of the tool and the number of the revolutions per minute and is generally referred to as the advance speed.

Typical and widely used cutting-edge geometries, also referred to as standard grindings, are described, for example, in the VDI guideline VDI 3208. In the case of these standard grindings, the cutting edge is divided into two linear partial cutting edges, wherein the outer partial cutting edge, which adjoins the circumference of the drill head, has an angle of incidence greater than 90°. The angle of incidence is typically in the range of 110° to 130°. The inner partial cutting edge, which is closest to the drill center axis, in contrast, has an angle of incidence less than 90°. This angle of incidence is typically in the range of 75° to 60°. The angle of incidence is defined in this case as the angle between the drill center axis and the tangent to the cutting edge. The partial cutting edges meet one another at the drill tip at a distance from the circumference of the drill which typically corresponds to ⅕ to ⅓ of the drill diameter. These standard grindings are particularly simple to produce due to the linear partial cutting edges and can be adapted to many different machining situations by variation of the angle of incidence and the distance of the drill tip from the circumference of the drill head.

A limit for the increase of the advance speed is given in the case of single-lip drills either by an overload of the tool due to excessively high cutting forces, which can result in tool fracture, and/or in that the chips may no longer be discharged through the chip discharge groove due to unfavorable chip shape and a buildup of chips can occur, i.e., jamming of the chips between chip discharge groove and borehole wall, which can also result in tool fracture.

The cutting angle of single-lip drills is typically 0°, whereby comparatively high cutting forces and wear forces occur during the cutting of the material. DE 103 16 116 A1 describes a single-lip drill, along the cutting edge of which a chip former is introduced. The chip former has a positive cutting angle and a negative discharge angle, whereby lower forces are achieved during the cutting and forming of the chips is achieved by the discharge. Therefore, a higher advance speed can be achieved.

DE 20 2009 012 566 U1 discloses a single-lip drill which has a strictly convexly curved cutting edge. A favorable chip form is thus achieved, which prevents jamming of the chips and therefore enables higher advance speeds. However, this single-lip drill has a cutting angle of 0° and therefore comparatively high cutting forces. These limit the achievable advance speed during the drilling, since they can result in tool fracture due to overload.

It is an object of the present invention to provide a single-lip drill, which has a low cutting force and a long service life. In particular, this single-lip drill is to manage without a chip former or chip breaker.

DISCLOSURE OF THE INVENTION

This object is achieved by the single-lip drill according to the invention, which has at least one cutting edge implemented on the drill head. The cutting surface of the drill head is implemented as concave over at least 75% of its width, preferably over at least 95% of its width, and essentially over its entire length up to and including the cutting edge. In this way, a reduced cutting force in relation to a conventional single-lip drill of the same diameter is implementable by the single-lip drill according to the invention during the drilling operation. This means simultaneously that with equal advance force and equal torque of the single-lip drill, a higher advance can be achieved in comparison to the conventional single-lip drill. In addition, the geometry according to the invention of the single-lip drill results in a reduction of the drill centering. This means that the deviation between the borehole entry point and the borehole exit point in a body to be drilled through is reduced in relation to a conventional single-lip drill. Since the drill centering of a single-lip drill becomes greater with decreasing borehole diameter, the single-lip drill according to the invention is particularly well suitable for manufacturing boreholes having small diameters, as are typical, for example, in injection systems of internal combustion engines. Finally, the drill geometry according to the invention results in a lengthened drill service life in comparison to conventional single-lip drills.

The effects according to the invention are particularly pronounced if the cutting surface of the drill head is implemented as concave over an as large as possible part of its width. The concave curvature of the cutting surface preferably ends at the drill center axis. To enable simple manufacturing of the drill head, it is preferable according to the invention for a region of the cutting surface to extend beyond the drill center axis. The region of the cutting surface lying beyond the drill center axis is in particular not curved in this case, which enables a simple runout of the machining tool used for this purpose during the production of the drill head.

The concave curvature of the cutting surface can be implemented according to the invention in various ways. In one embodiment of the invention, the curvature of the cutting surface extends strictly concavely. In another embodiment of the invention, the concave curvature of the cutting surface consists of at least three level partial cutting surfaces, which jointly form a concave contour. In this case, the partial cutting surface closest to the drill center axis extends in particular along the radius of the drill head.

The cutting edge of the single-lip drill according to the invention has in particular a positive cutting angle, which results due to the concave surface in conjunction with the angle of incidence of the cutting edges. This can result in the formation of a long chip during the drilling operation. Therefore, the geometry according to the invention of the single-lip drill is used for another purpose than, for example, known chip breakers, which are provided for the purpose of forming chips which are small enough to be reliably moved. A chip breaker along the cutting edge of the drill head is not required according to the invention. It is therefore preferable that the single-lip drill according to the invention does not have a chip breaker.

Fundamentally, the cutting edge of the single-lip drill according to the invention can have any arbitrary grinding. However, it is preferable for the cutting edge to have a strictly convexly curved contour, and for a point of the convex contour which is located farthest in the advance direction to be arranged at a distance to the circumference of the drill head which corresponds to one fifth to one third, in particular one fourth, of the drill diameter, for example, corresponding to DE 20 2009 012 566 U1.

Furthermore, it is preferable for the drill head to be at least partially coated with a hard material. The coating of the drill head of a conventional single-lip drill by means of a hard material is problematic insofar as during the grinding of a chip breaker into the cutting edge, a part of the hard material is removed and subsequently it must be applied again during a further processing step. Since the single-lip drill according to the invention does not require a chip breaker, it is easily producible in a hard material-coated embodiment and simultaneously also can be easily reground.

A further very great advantage during the regrinding of the single-lip drill according to the invention is provided in that only the worn part of the grinding must be ground off during the regrinding. In contrast thereto, in the case of a single-lip drill having chip breaker, the entire chip breaker must always be set back.

BRIEF DESCRIPTION OF THE DRAWINGS

FIG. 13 shows a side view of the drill head of the single-lip drill according to FIG. 7.

FIG. 14 is a sectional view of FIG. 13.

FIG. 15 is another sectional view of FIG. 13.

FIG. 16 is still another sectional view of FIG. 13.

FIG. 17 shows a single-lip drill according to another embodiment of the invention.

EMBODIMENTS OF THE INVENTION

Figure 1:
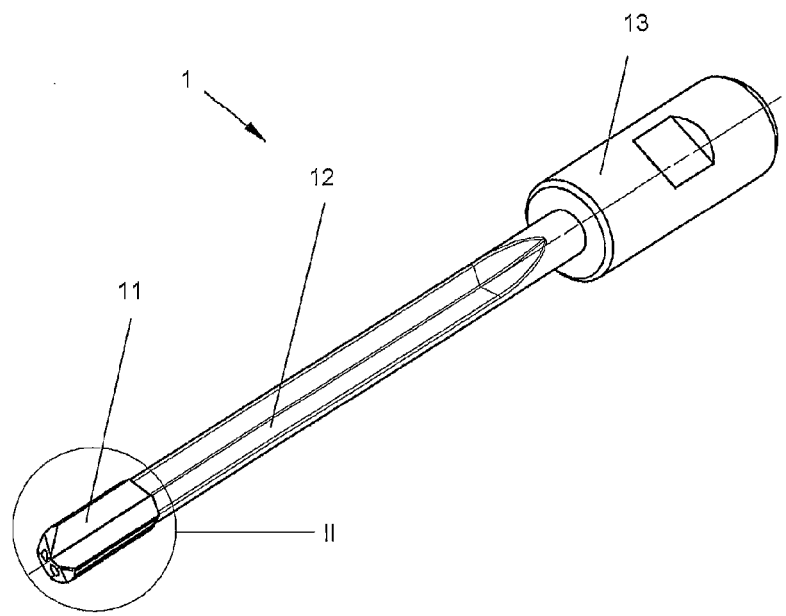
FIG. 1 shows an isometric illustration of a single-lip drill according to the prior art.
Figure 2:
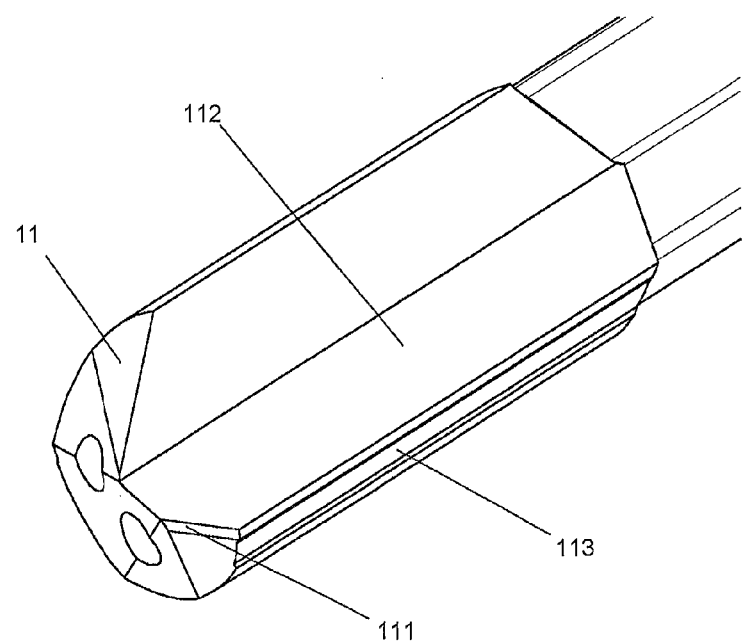
FIG. 2 shows a detail from FIG. 1.
Figure 3:
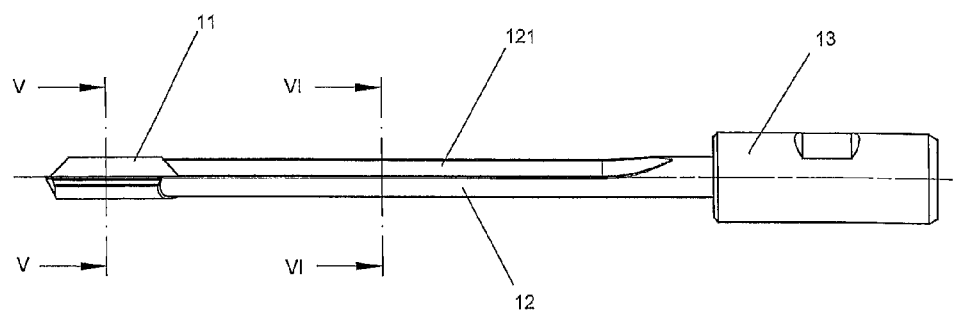
FIG. 3 shows a side view of the single-lip drill according to FIG. 1.
Figure 4:
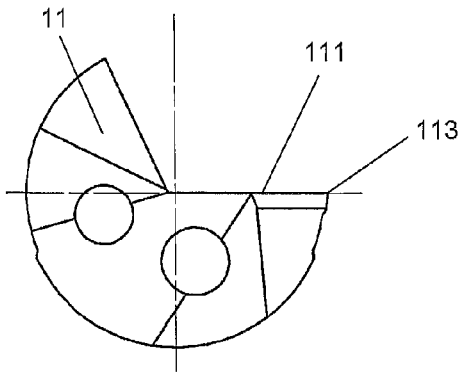
FIG. 4 shows a top view of the drill head of the single-lip drill according to FIG. 1 along the drill center axis.
Figure 5:
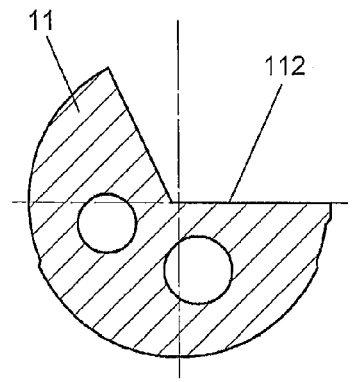
FIG. 5 shows a sectional view of the drill head of the single-lip drill according to FIG. 1.
Figure 6:
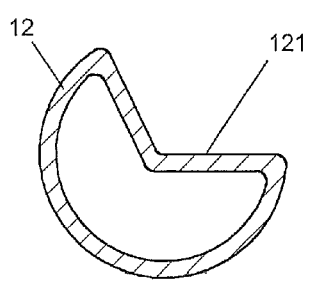
FIG. 6 shows a sectional view of the drill shaft of the single-lip drill according to FIG. 1.

A conventional single-lip drill 1 according to the prior art is illustrated in FIGS. 1 to 3. It consists of a drill head 11, a drill shaft 12, and a chucking end 13 to be received in a drill chuck (not shown). A top view of its drill head 11 along the drill center axis, i.e., opposite to the advance direction, is shown in FIG. 4. A section of the drill head 11 along the line, which is identified with V in FIG. 3, is illustrated in FIG. 5. A section of the drill shaft 12 along the line, which is identified with VI in FIG. 3, is illustrated in FIG. 6. As can be seen from FIGS. 4 to 6, the drill cutting edge 111 visible in FIG. 4 and also the cutting surface 112 illustrated in FIG. 5 and also the chip discharge groove 121 of the single-lip drill 1 which can be seen in FIG. 6 each have a level surface. The secondary cutting edge 113, which extends essentially in the axial direction of the drill and delimits the cutting surface toward the circumference of the drill, adjoins the cutting edge 111. Such a single-lip drill 1 has a cutting angle of 0°. A positive cutting angle can only be achieved by grinding a chip breaker into the cutting edge 111. The advance force for such a single-lip drill 1 at a diameter of 10 mm is 500 N and the torque is 2.5 Nm. These values were ascertained in the experiment in the case of the machining of quenched and tempered steel. In this case, such a single-lip drill 1 reaches an advance speed of 100 mm/minute.

Figure 7:
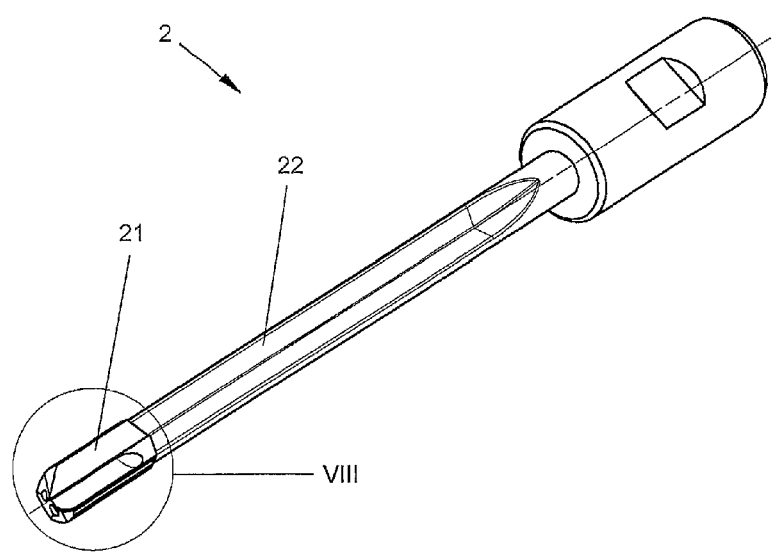
FIG. 7 shows an isometric view of a single-lip drill according to a preferred embodiment of the invention.
Figure 8:
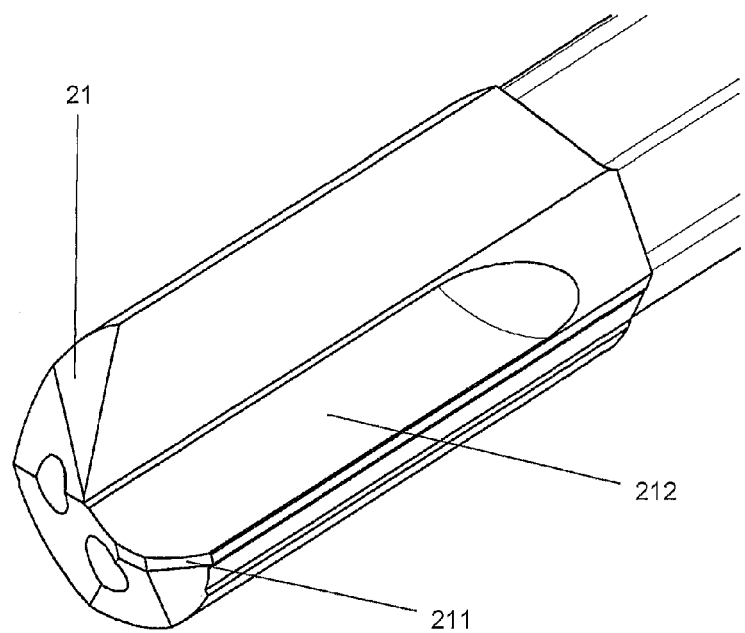
FIG. 8 shows a detail from FIG. 7.
Figure 9:
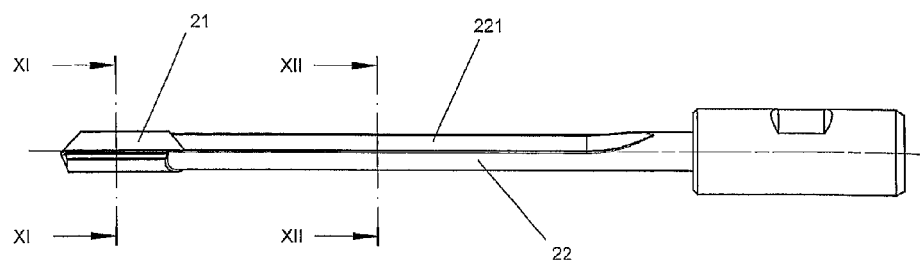
FIG. 9 shows a side view of the single-lip drill according to FIG. 7.
Figure 10:
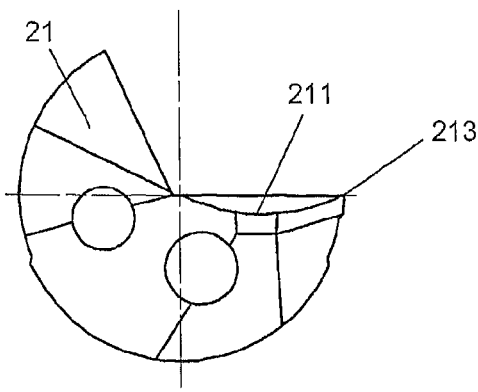
FIG. 10 shows a top view of the drill head of the single-lip drill according to FIG. 7 along the drill center axis.
Figure 11:
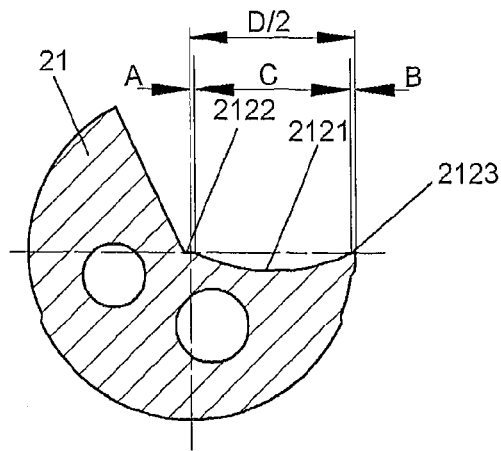
FIG. 11 shows a sectional view of the drill head of the single-lip drill according to FIG. 7.
Figure 12:
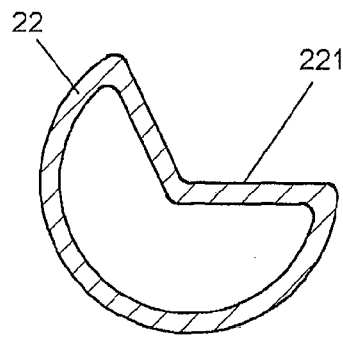
FIG. 12 shows a sectional view of the drill shaft of the single-lip drill according to FIG. 7.

A single-lip drill 2 according to a preferred embodiment of the invention is shown in FIGS. 7 to 9. A top view of its drill head 21 along the drill center axis is shown in FIG. 10. A section of the drill head 21 along the line which is identified with XI in FIG. 9 is shown in FIG. 11. A section of the drill shaft 22 along the line which is identified with XII in FIG. 9 is shown in FIG. 12. It can be seen that the cutting surface 212, as shown in FIG. 11, up to and including the drill cutting edge 211, as shown in FIG. 10, extends continuously strictly concavely in a first region 2121 over the largest part of the radius of the drilling head 21, i.e., from the circumferential surface of the drill head 21 up to the drill center axis. The cutting surface 212 of the drill head 21 extends beyond the drill center axis, wherein a region 2122 of the cutting surface 212 is not curved, but rather extends planar. The region 2122 extends in this case both beyond the drill center axis, and also from the drill center axis in the direction of the secondary cutting edge of the drill having the width A. A planar region 2123 of the cutting surface having the width B extends along the secondary cutting edge. Therefore, a width of the concave region of C=(D/2)−A−B results, wherein C is preferably 95% of (D/2). The planar regions 2122 and 2123 make it easier to manufacture the single-lip drill 2 according to the invention. Alternatively, it can also be provided that the concave region 2121 of the cutting surface extends up to the drill center axis and/or up to the circumference of the drill head. It can therefore be provided that the planar regions 2122 and/or 2123 are not implemented on the drill head. The chip discharge groove 221 of the drill shaft 22 is not implemented as concave, as can be seen in FIG. 12. FIG. 13 shows a side view of the drill head 21 of the single-lip drill 2 according to this embodiment of the invention. As shown, the concave region 2121 of the cutting surface 212 extends, originating from the drill cutting edge 211, over only a part of the length of the drill head 21, however, it could in principle also extend over the entire length of the drill head. A sectional view according to the line identified with XIV in FIG. 13 is shown in FIG. 14.

It can be seen that the concave curvature of the cutting surface 212 and the cutting edge 211 runs out toward the drill circumference at an angle of 11.4°. FIG. 15 shows a sectional view of the drill head according to the line which extends in FIG. 13 along the line identified with XV. It can be seen that the concave curvature of the cutting surface 212 and the cutting edge 211 runs out toward the drill center axis at an angle of 7.8°. A section of the drill head along the line identified with XVI in FIG. 13 is shown in FIG. 16. At the lowest point of the cutting surface 212, its curvature is 0°. At equal advance force of 500 N, equal torque of 2.5 Nm, and a drill diameter of 10 mm, as with the above-described conventional single-lip drill 1, the single-lip drill 2 according to the first embodiment of the invention reaches an advance speed of 160 mm/minute.

Figure 18:
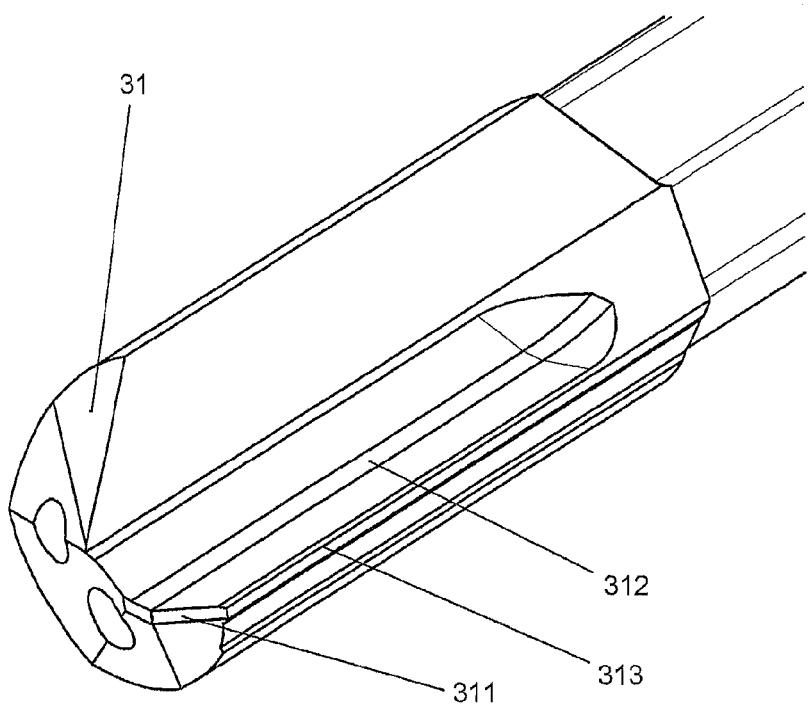
FIG. 18 shows a detail from FIG. 17.
Figure 19:
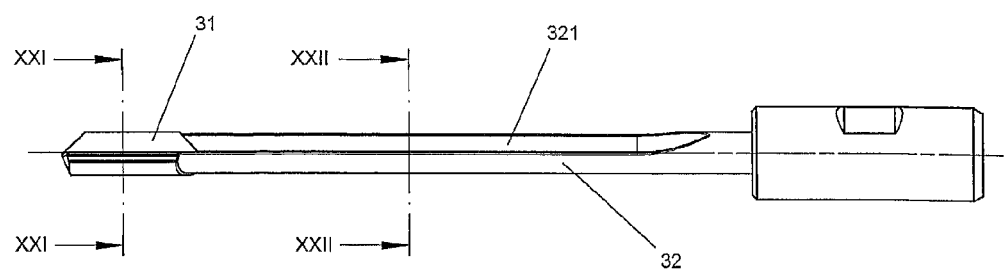
FIG. 19 shows a side view of the single-lip drill according to FIG. 17.
Figure 20:
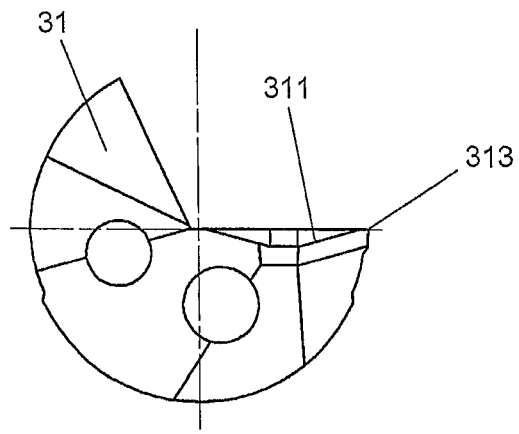
FIG. 20 shows a top view of the drill head of the single-lip drill according to FIG. 17 along the drill center axis.
Figure 21:
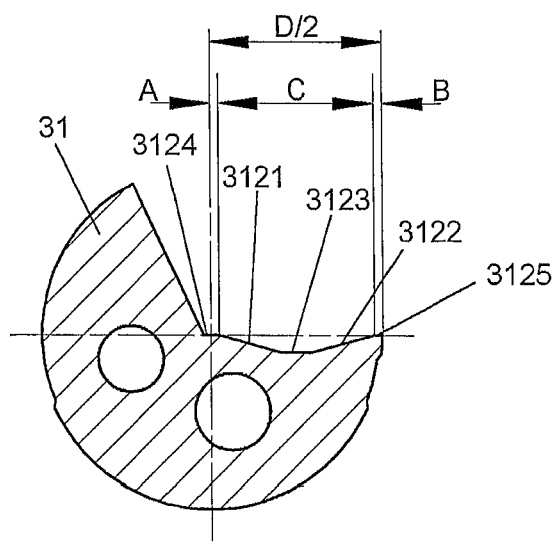
FIG. 21 shows a sectional view of the drill head of the single-lip drill according to FIG. 17.
Figure 22:
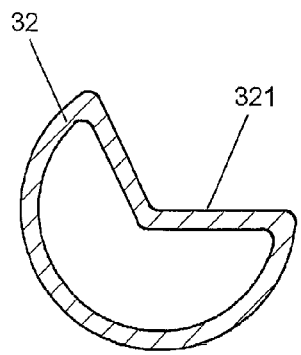
FIG. 22 shows a sectional view of the drill shaft of the single-lip drill according to FIG. 17.
Figure 23:
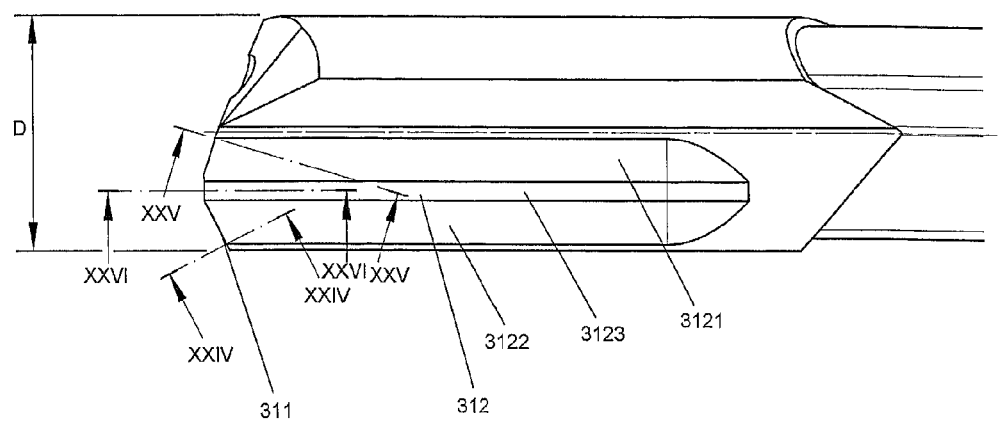
FIG. 23 shows a side view of the drill head of the single-lip drill according to FIG. 17.
Figure 24:
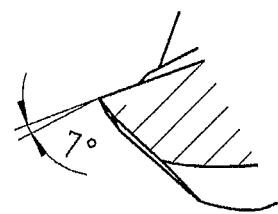
FIG. 24 is a sectional view of FIG. 23.
Figure 25:
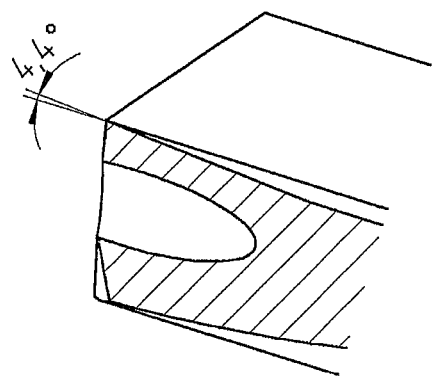
FIG. 25 is another sectional view of FIG. 23.
Figure 26:
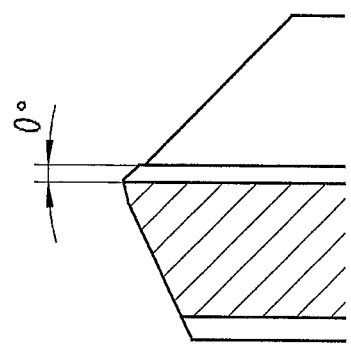
FIG. 26 is still another sectional view of FIG. 23.

A single-lip drill 3 according to another embodiment of the invention is shown in FIGS. 17 to 19. A top view of its drill head 31 along the drill center axis is shown in FIG. 17. A section of the drill head 31 along the line identified with XX in FIG. 19 is shown in FIG. 20. A section of the drill shaft 32 along the line identified with XXI in FIG. 19 is shown in FIG. 21. The chip discharge groove 321 of the drill shaft 32 is not implemented as concave, as in the first embodiment of the invention. The secondary cutting edge 313, which extends essentially in the axial direction of the drill and delimits the cutting surface toward the circumference of the drill, adjoins the cutting edge 311. It can be seen in FIGS. 20 and 21 that the cutting surface 312 of the single-lip drill 3 according to this embodiment of the invention is composed of five partial cutting surfaces 3121, 3122, 3123, 3124, 3125. A first cutting surface 3121, which is closest to the drill center axis, extends along the radius of the drill head 31. The second partial cutting surface 3122, which is closest to the circumferential surface of the drill head 31, has the same width as the first partial cutting surface 3121. A third partial cutting surface 3123, which is shorter than the first partial cutting surface 3121 and the second partial cutting surface 3122, connects these two to one another. The angle between the first partial cutting surface 3121 and the third partial cutting surface 3123 and the angle between the second partial cutting surface 3122 and the third partial cutting surface 3123 are of equal size. These three partial cutting surfaces 3121, 3122, 3123 jointly provide the cutting surface 312 with a concave curvature. A fourth partial cutting surface 3124, which partially lies on the side of the drill center axis facing away from the first partial cutting surface 3121, does not participate in the concave curvature, like the region 2122 of the cutting surface 212 of the single-lip drill 2 according to the first embodiment of the invention. The region 3124 extends in this case both beyond the drill center axis, and also from the drill center axis in the direction of the secondary cutting edge of the drill with the width A. A planar region 3125 of the cutting surface having the width B extends along the secondary cutting edge. A width of the concave region therefore results in C=(D/2)−A−B, wherein C is preferably 95% of (D/2). The planar regions 3124 and 3125 make it easier to manufacture the single-lip drill 3 according to the invention. Alternatively, it can also be provided that the concave region of the partial cutting surfaces 3121, 3122, and 3123 extends up to the drill center axis and/or up to the circumference of the drill head. It can therefore be provided that the partial cutting surfaces 3124 and/or 3125 are not implemented on the drill head. FIG. 23 shows a side view of the drill head of the single-lip drill according to this embodiment of the invention. As shown, the concave region of the cutting surface 312 extends, originating from the drill cutting edge 311, over only a part of the length of the drill head 31, however, it could in principle also extend over the entire length of the drill head. A section along the line identified in FIG. 23 with XXIV is shown in FIG. 24. It can be seen therein that the second partial cutting surface 3122 and the part of the cutting edge 311 assigned thereto run out toward the circumference of the drill head 31 at an angle of 7°. A section along the line identified in FIG. 23 with XXV is shown in FIG. 25. It can be seen therein that the first partial cutting surface 3121 and the part of the cutting edge 311 assigned thereto run out toward the drill center axis at an angle of 4.4°. A section along the line identified in FIG. 23 with XXVI is illustrated in FIG. 26. An angle of the third partial cutting surface 3123 of 0° can be seen therein. The single-lip drill 3 according to the second embodiment of the invention has, like the single-lip drill 2 according to the first embodiment of the invention, at a diameter of the drill head 31 of 10 mm, an advance force of 500 N, and a torque of 2.5 Nm, an improved advance speed of 160 mm/minute in comparison to the advance speed of the conventional single-lip drill 1 with an advance speed of 100 mm/min. All further advantages of the single-lip drill 2 according to the first embodiment of the invention are also implemented in the second embodiment of the invention.

The drill geometry according to the described embodiments of the invention thus enables, in comparison to conventional drill geometry, a single-lip drill 2, 3 to be provided having reduced cutting force, a small amount of drill centering, and longer service life.

The invention claimed is:

1. A single-lip drill (2, 3) comprising a shaft (22, 32) and a drill head (21, 31) having at least one cutting edge (211, 311) implemented on the drill head (21, 31), wherein its cutting surface (212, 213) is implemented as concave over 75% to 95% of its width and essentially over its entire length up to and including the cutting edge (211, 311).

2. A single-lip drill (2, 3) having at least one cutting edge (211, 311) implemented on a drill head (21, 31),
    wherein its cutting surface (212, 213) is implemented in a radial direction as concave over at least 75% of its width and essentially over its entire length,
    wherein the cutting surface (212) has a non-curved first region (2122) of a width A which extends from the drill middle axis in a direction of an auxiliary cutting edge of the single-lip drill (2, 3), a planar second region (2123) of a width B which extends along the auxiliary cutting edge, and a concave region (2121), arranged between the first and second regions (2122, 2123), of a width C=(D/2−A−B) at a diameter fl of the single-lip drill (2, 3), and
    wherein the cutting surface is concavely formed up to and including the cutting edge (211, 311).

3. The single-lip drill according to claim 2, wherein the concave curvature of the cutting surface (312) comprises at least three level partial cutting surfaces (3121, 3122, 3123), which jointly in the radial direction form a concave contour.

4. The Single-lip drill according to claim 2, wherein the concave curvature of the cutting surface (212, 312) in the radial direction ends at the circumference of the drill.

5. The single-lip drill according to claim 2, wherein a region (2122, 3124) of the cutting surface (212, 312) in the radial direction extends beyond the drill center axis.

6. The single-lip drill according to claim 2, wherein the concave curvature of the cutting surface (212, 312) in the radial direction ends at the drill center axis.

7. The single-lip drill according to claim 1, wherein the curvature of the cutting surface (212) extends strictly concavely.

8. The single-lip drill according to claim 1, wherein the cutting edge (211, 311) has a positive cutting angle.

9. The single-lip drill according to claim 1, wherein the cutting edge (211, 311) has a strictly convexly curved contour in the advance direction, and a point of the convex contour which is located farthest in the advance direction is arranged at a distance to the circumference of the drill head (21, 31), which corresponds to one fifth to one third of the drill diameter.

10. The single-lip drill according to claim 1, wherein the drill head (21, 31) does not have a chip breaker.

11. The single-lip drill according to claim 1, wherein the drill head (21, 31) is at least partially coated with a hard material.

12. The single-lip drill according to claim 11, wherein the drill head (21, 31) is completely coated.

13. The single-lip drill according to claim 11, wherein at least the cutting surface (212, 312) and the circumference of the drill head (21, 31) are coated.

14. The single-lip drill according to claim 1, wherein both the drill head (21, 31) and the shaft (22, 32) comprise hard metal.

15. The single-lip drill according to claim 1, wherein the drill head (21, 31) and the shaft (22, 32) are implemented in one piece.

16. The single-lip drill according to claim 2, wherein the cutting surface (212, 312) is implemented in the radial direction as concave over at least 95% of its width.

* * * * *

UNITED STATES PATENT AND TRADEMARK OFFICE
CERTIFICATE OF CORRECTION

PATENT NO. : 9,669,474 B2
APPLICATION NO. : 14/423167
DATED : June 6, 2017
INVENTOR(S) : Wenzelburger et al.

It is certified that error appears in the above-identified patent and that said Letters Patent is hereby corrected as shown below:

In the Claims

In particular, in Column 7, Line 49, (Claim 2) please change "fl" to correctly read: --D--.

In Column 8, Line 7, (Claim 4) please change "Single-lip" to correctly read: --single-lip--.

Signed and Sealed this
First Day of August, 2017

Joseph Matal
*Performing the Functions and Duties of the*
*Under Secretary of Commerce for Intellectual Property and*
*Director of the United States Patent and Trademark Office*